United States Patent
Metz et al.

(10) Patent No.: US 9,615,408 B2
(45) Date of Patent: Apr. 4, 2017

(54) COOKING DEVICE

(71) Applicant: Miele & Cie. KG, Guetersloh (DE)

(72) Inventors: Thomas Metz, Buende (DE); Ruediger Hoehn, Hiddenhausen (DE); Carolin Kaudewitz, Rheda-Wiedenbrueck (DE); Christian Schulze, Enger (DE); Andre Peters, Herford (DE)

(73) Assignee: MIELE & CIE. KG, Guetersloh (DE)

( * ) Notice: Subject to any disclaimer, the term of this patent is extended or adjusted under 35 U.S.C. 154(b) by 0 days.

(21) Appl. No.: 14/834,446

(22) Filed: Aug. 25, 2015

(65) Prior Publication Data

US 2016/0066366 A1    Mar. 3, 2016

(30) Foreign Application Priority Data

Aug. 29, 2014 (DE) ................. 10 2014 112 423

(51) Int. Cl.
| | |
|---|---|
| *H05B 6/80* | (2006.01) |
| *H05B 6/64* | (2006.01) |
| *A47J 36/02* | (2006.01) |
| *A47J 27/04* | (2006.01) |

(52) U.S. Cl.
CPC ............ *H05B 6/6408* (2013.01); *A47J 27/04* (2013.01); *A47J 36/027* (2013.01); *H05B 6/6402* (2013.01); *H05B 6/647* (2013.01); *H05B 6/6479* (2013.01); *A47J 2027/043* (2013.01)

(58) Field of Classification Search
CPC .... H05B 6/6408; H05B 6/647; H05B 6/6402; A47J 27/04; A47J 2027/043

USPC ....... 219/390, 621, 681, 690, 725, 729, 746, 219/762
See application file for complete search history.

(56) References Cited

U.S. PATENT DOCUMENTS

| | | | | |
|---|---|---|---|---|
| 4,080,524 A | * | 3/1978 | Greenfield, Jr. ..... | H05B 6/6402 219/729 |
| 4,558,198 A | * | 12/1985 | Levendusky ......... | A47J 36/027 126/390.1 |
| 4,560,850 A | | 12/1985 | Levendusky et al. | |
| 5,347,108 A | * | 9/1994 | Minakawa ........... | H05B 6/6464 219/696 |

(Continued)

FOREIGN PATENT DOCUMENTS

| | | |
|---|---|---|
| EP | 1741986 A1 | 1/2007 |
| EP | 2182774 A1 | 5/2010 |

(Continued)

*Primary Examiner* — Thien S Tran
(74) *Attorney, Agent, or Firm* — Leydig, Voit & Mayer, Ltd.

(57) ABSTRACT

A cooking system includes a cooking appliance with a microwave heat source and a cooking container for receiving food. The cooking appliance includes a cooking chamber having a muffle and a support device arranged on the muffle that positions the cooking container in the cooking chamber. The cooking container has a base and four side walls arranged transversely to the base as two opposing longitudinal sides and two opposing broadsides. The cooking container, at transitions from the two opposing broadsides to the two opposing longitudinal sides, has four corners, each of which has a rounded region having an external radius of at least 30 mm to maintain a minimum spacing from the muffle to counteract electrical flashovers between the cooking container and the cooking chamber.

12 Claims, 3 Drawing Sheets

(56) References Cited

U.S. PATENT DOCUMENTS

2007/0221070 A1\* 9/2007 Akashi ................ F24C 7/08
                                                          99/331

FOREIGN PATENT DOCUMENTS

| EP | 2333419 A1 | | 6/2011 |
|----|------------|---|--------|
| FR | 2603096 A1 | | 2/1988 |
| JP | H 07113527 A | | 5/1995 |
| JP | 200687843 A | | 4/2006 |
| JP | 2007-101062 | \* | 4/2007 |
| JP | 201121767 A | | 2/2011 |
| KR | 1020110058152 | \* | 6/2011 |
| KR | 1020110058152 A | | 6/2011 |
| WO | 2006138645 A2 | | 12/2006 |

\* cited by examiner

COOKING DEVICE

CROSS-REFERENCE TO PRIOR APPLICATION

Priority is claimed to German Patent Application No. DE 10 2014 112 423.5, filed on Aug. 29, 2014, the entire disclosure of which is hereby incorporated by reference herein.

FIELD

The present invention relates to a cooking system comprising a cooking appliance and at least one cooking container for receiving food. The cooking appliance comprises at least one microwave heat source. The cooking appliance comprises at least one cooking chamber having at least one muffle and at least one support device arranged on the muffle for positioning the cooking container in the cooking chamber.

BACKGROUND

Cooking appliances generally have one or more heat sources for preparing food in a cooking chamber. In this case, a combination of different heat sources is often particularly expedient, as the heat sources then supplement one another with respect to their advantages. Thus, for example, a microwave heat source has very good efficiency as the energy of the microwaves is immediately available and the food is cooked from the inside. Steam heat sources, for example, allow particularly gentle cooking and prevent food from drying out during cooking.

The combination of different heat sources is a technical challenge, in particular in the case of so-called combined appliances having a microwave heat source and a thermal heat source. On the one hand, in a combined appliance of this type, the cooking chamber together with the cooking containers used must be heat-resistant in relation to the temperatures to be expected when operating the thermal heat source. On the other hand, when using microwave heat sources, care has to be taken that unfavourable heat and voltage flashovers do not occur due to the power input.

Care should be taken particularly in the design of cooking containers for combined appliances of this type to ensure that flashovers do not occur between the cooking container and cooking chamber, as such flashovers can spoil the appearance of the cooking container or even damage it and also affect the cooking chamber casing.

Cooking containers are therefore known from the prior art, which are formed of plastics material or ceramic. In addition, cooking containers made of metal are also known, the use of which, however, in microwave operation, is prohibited by the manufacturers. In commercial appliances, metallic cooking containers, which are received in tray trolleys in such a way that the spacing from the cooking chamber is very large, are known. The drawback in this is the very high space requirement, so solutions of this type are ruled out in the tight dimensions of a household appliance.

SUMMARY

A cooking system includes a cooking appliance with a microwave heat source and a cooking container for receiving food. The cooking appliance includes a cooking chamber having a muffle and a support device arranged on the muffle that positions the cooking container in the cooking chamber. The cooking container has a base and four side walls arranged transversely to the base as two opposing longitudinal sides and two opposing broadsides. The cooking container, at transitions from the two opposing broadsides to the two opposing longitudinal sides, has four corners, each of which has a rounded region having an external radius of at least 30 mm to maintain a minimum spacing from the muffle to counteract electrical flashovers between the cooking container and the cooking chamber.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
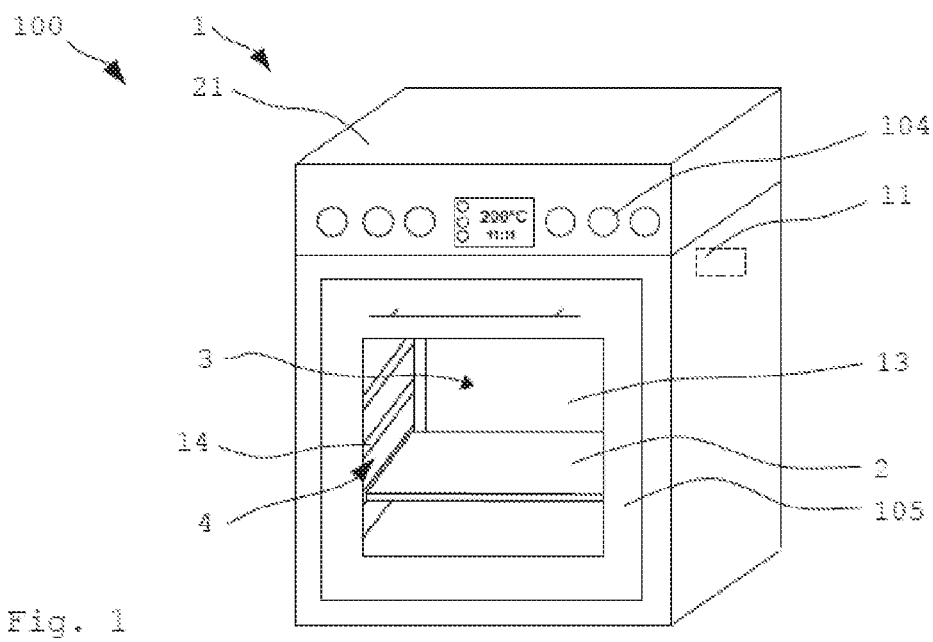
FIG. 1 is a schematic perspective view of the cooking system 100.

The cooking system according to the invention comprises at least one cooking appliance and at least one cooking container for receiving food. The cooking appliance has at least one microwave heat source and at least one cooking chamber having at least one muffle. At least one support device for positioning the cooking container in the cooking chamber is provided on the muffle. The cooking container comprises at least one base and at least 4 side walls arranged transversely to the base. It is possible for at least one side wall to be formed by a door at least in part. The side walls comprise at least two opposing longitudinal sides and at least two opposing broadsides. In this case, the cooking container has at least 4 corners at transitions from the broadside to the longitudinal side. The corners are configured here having at least one rounded region in each case to maintain a minimum spacing from the muffle. The rounded region, in this case, has at least one external radius of at least 30 mm in order to counteract electrical flashovers between the cooking container and cooking chamber.

The cooking system according to the invention has many advantages. A substantial advantage is that at least one cooking appliance and at least one cooking container are provided, the cooking container having rounded regions having an external radius of at least 30 mm. A minimum radius of this type ensures that an adequate minimum spacing can always been maintained between the cooking container and the cooking chamber. Smaller radii would lead here to the corners of the cooking container coming so close to the cooking chamber that voltage flashovers may occur. As a result, the cooking container according to the invention can be formed without problems from a metallic material without voltage flashovers occurring during regular operation in microwave operation.

A further advantage of the cooking system is that the available cooking chamber can be optimally utilised. As voltage flashovers are already reliably avoided owing to the rounded corners, the cooking container can be correspondingly tightly received in the cooking chamber. The cooking system can be particularly advantageously used in the domestic sector owing to such an optimal utilisation of space.

The rounding of the corners also provides hygienic advantages here as cooking containers of this type can also be very easily cleaned and kept clean. This is advantageous, for example, compared to cooking containers from the prior art, which curl the container edge in a complicated manner in order to avoid flashovers. Such curled regions are, however, generally very difficult to keep clean. In addition, rounded areas of this type provided according to the invention having the corresponding radius can be implemented in an uncomplicated manner during production and therefore economically produced.

In a preferred development, the external radius of the rounded region is at least 35 mm. With a radius of this type, the occurrence of electrical flashovers can be prevented still more effectively.

In another preferred development, the minimum spacing between the cooking container and muffle is at least 8 mm. The minimum spacing is particularly preferably at least 10 mm. A minimum spacing of this type ensures reliable flashover protection and at the same time provides optimal utilisation of space for the cooking container in the cooking chamber. It is provided, in particular, here that the minimum spacing is maintained regardless of the positioning of the cooking container on the support device. In particular, the external radius of the rounded region is matched here to the required minimum spacing. For example, a minimum spacing of at least 10 mm can be achieved particularly well by means of a rounded region having an external radius of more than 35 mm. In particular, the minimum spacing is also maintained when the cooking container is arranged in a tilted and/or slightly oblique position on the support device.

The rounded regions are preferably formed on at least one container edge. The container edge is arranged here, in particular, on at least one side wall. In particular, the container edge comprises at least one end edge projecting outwards from the broadside. The container edge can also comprise at least one side edge projecting outwards from the longitudinal side. A container edge of this type may serve particularly well for guiding the cooking container in the support device. The rounded regions configured on the container edge reliably prevent falling below the minimum spacing from the muffle, in particular even when the cooking container is guided in an at least slightly tilted manner. In particular, the container edge comprises at least one end edge arranged transversely to the broadside and/or at least one side edge arranged transversely to the longitudinal side. The end edge and/or the side edge preferably extend substantially parallel to the base of the cooking container. The end edge is, in particular, narrower than 20 mm. The end edge is preferably narrower than 12 mm. In particular, the end edge is wider than 3 mm and preferably wider than 5 mm. It is also possible for no end edge to be provided at all. Configurations of this type permit the volume of the cooking chamber to be optimally utilised. In addition, the region of the cooking container provided for the food is not unnecessarily restricted thereby.

In an advantageous development, the support device has at least one horizontally extending rod. In particular, at least two rods are provided. The rods are in particular arranged at the same height on opposing sides of the muffle. It is also possible for two respective opposing rods to be provided at different heights in the cooking chamber. In this case, two respective rods characterise an insertion position for the cooking container. The rod is, in particular, suitable for serving and configured to serve as a guide for the side edge. In this case, the side edge in particular rests on the rod at least in part. The rod has, in particular, a diameter of at least 3 mm and preferably of at least 4 mm. A bending of the rods, even in the case of heavily loaded cooking containers, can be reliably avoided by a diameter of this type.

A clearance between the rod and at least one of the longitudinal sides is particularly preferably a maximum of 4 mm. The clearance is preferably a maximum of 2.5 mm. Owing to such a small clearance, tilting of the cooking container in the support device is effectively prevented. In addition, the small clearance prevents the minimum spacing from being falling below.

It is possible for the support device to have at least one stop for the rounded region. In this case, the stop is, in particular, suitable for limiting and configured to limit an insertion depth of the cooking container into the cooking chamber. The stop may also be provided here for a side wall and/or the container edge. For example, the stop is configured as a transverse strut. The transverse strut runs, in particular, transversely to at least one rod, which is provided for guiding the side edge of the cooking container. A stop of this type effectively prevents the broadside of the cooking container striking against the rear cooking chamber wall, which may result in flashovers occurring.

The side walls preferably have a height of at least 30 mm. The height of the side walls is particularly preferably at least 40 mm.

In particular, the corners in each case have at least one rounded region having an internal radius of a maximum of 30 mm. The internal radius is preferably less than 24 mm. By taking into consideration such dimensions for the internal radius, the occurrence of voltage peaks can be reliably counteracted.

It is preferred for the cooking container to have a width which is at most 3 times a depth. The width extends here along the broadside and the depth extends along the longitudinal side. In particular, the width and depth have a ratio here of about 2:1.

For example, the width of the cooking container is 325 mm and the depth is 170 mm. A ratio of width to depth of this type effectively prevents bending of the rods of the support device even in the case of very loaded cooking containers.

The support device is preferably arranged in an electrically insulated manner on the muffle. In particular, at least one insulating body is provided here between a rod and the muffle. For example, the rod is inserted in a recess of the muffle, the rod being surrounded by an insulating sleeve. Voltage peaks are avoided by an insulating receiver. It is, however, also possible for the support device to be electrically contacted by the muffle.

In a particularly preferred embodiment, the cooking appliance is configured as a combined appliance having a steam cooking function and a microwave cooking function. For this purpose, at least one steam heat source and at least one microwave heat source are provided. The advantages of the cooking container described above can be utilised particularly well in a combined appliance of this type. On the one hand, the cooking container in a metallic configuration is particularly suitable for receiving the food during a steam cooking process and, on the other hand, it can be used in microwave operation without having to fear voltage flashovers.

FIG. 1 shows a cooking system 100 according to the invention comprising a cooking appliance 1 and a cooking container 2 received in a cooking chamber 3 of the cooking appliance 1. The cooking appliance 1 can be operated by a user by means of an operating device 104 and has a cooking chamber 3 for treating the food. The cooking chamber 3 can be closed by means of a door 105. For warming or heating the food, the cooking appliance 1 has a microwave heat source 11 and a schematically shown steam generator 10. Further thermal heat sources may be provided, such as upper and lower heating members or a circulating air heat source. In this case, different heat source can be operated individually or else in any combination. The cooking appliance 1 can be configured both as a built-in appliance and a stand-alone cooking appliance 1. The cooking appliance 1 is configured as a combined appliance 21 here.

The cooking chamber 3 is surrounded here by a muffle 13, which, together with the door 105, prevents an escape of microwaves and substantially also steam. The door 105 can be opened by a door opener. At least one safety device is provided, which prevents microwave operation when the door 105 is not correctly closed.

A support device 4 is arranged on the muffle 13 for positioning the cooking container 2 and also other food carriers such as baking sheets or gratings. The support device 4 consists here of two support gratings fastened to opposing side faces of the muffle 13. The support grating consists here of a plurality of rods, which are arranged in the longitudinal direction or in the transverse direction and are interconnected. In this case, one or more cooking containers 2 can be inserted in different height positions along the longitudinal rods.

Figure 2:
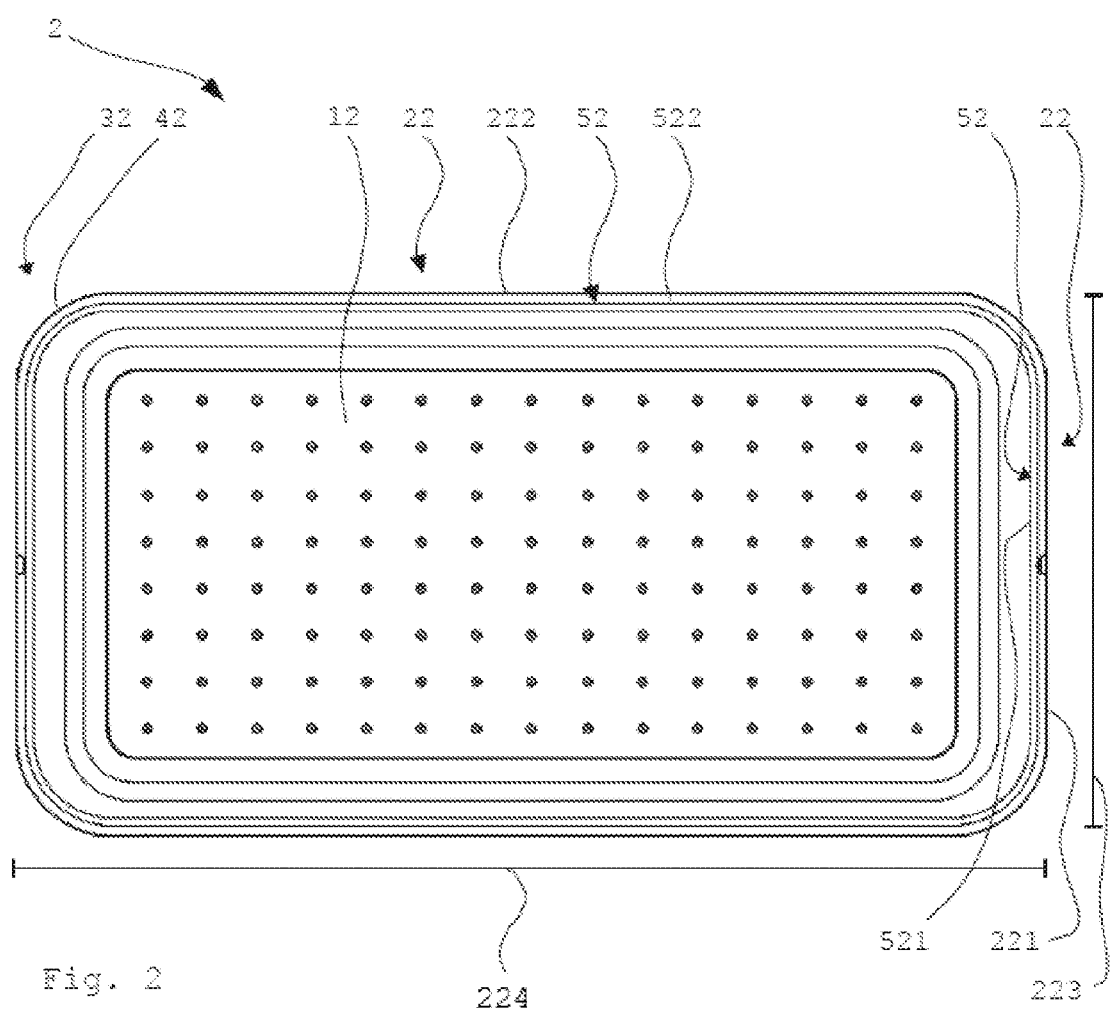
FIG. 2 is a schematic plan view of a cooking container of the cooking system according to FIG. 1.
Figure 3:
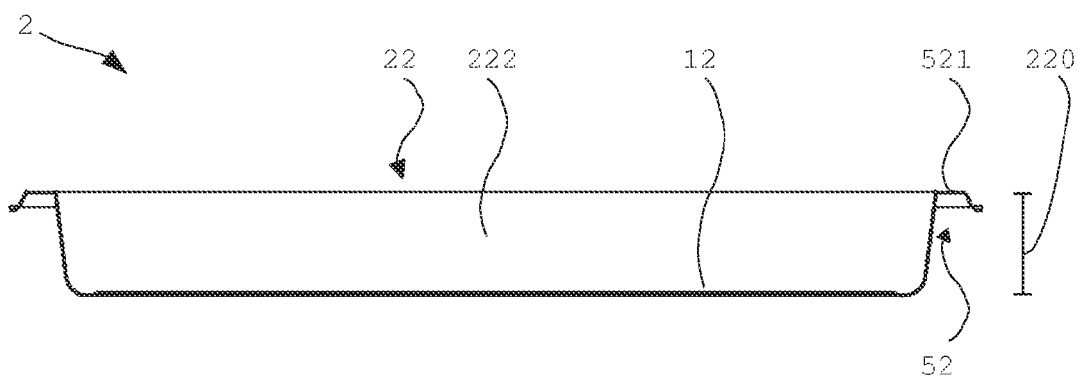
FIG. 3 is a longitudinal section of the cooking container according to FIG. 2.
Figure 4:
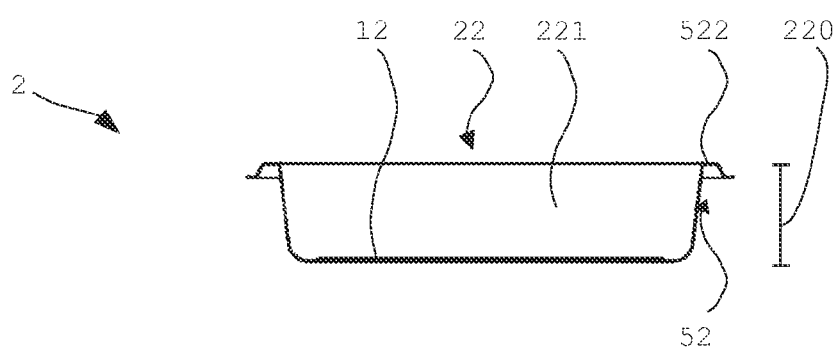
FIG. 4 is a cross section of the cooking container according to FIG. 2.
Figure 5:
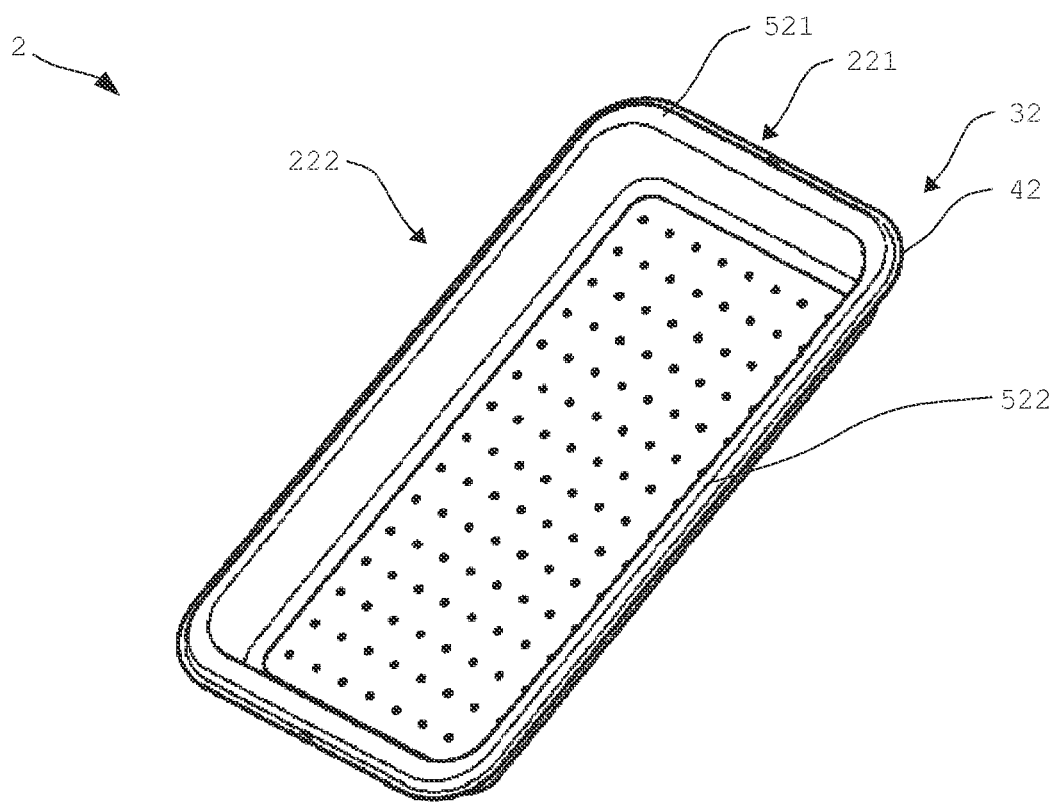
FIG. 5 is a perspective view of the cooking container according to FIG. 2.

In an embodiment by way of example, the cooking container 2 is shown in a plan view in FIG. 2 and in a side view in longitudinal section and in cross section respectively in FIGS. 3 and 4. FIG. 5 shows the cooking container 2 in a perspective view.

The cooking container 2 comprises a base 12 having a plurality of holes for improving the passage of steam. A total of 4 interconnected side walls 22 are arranged transversely to the base 12. The side walls 22 are arranged at an angle of slightly greater than 90° with respect to the base 12 in order to make it possible to more easily remove food from the cooking container 2. Two respective opposing side walls 22 are configured as broadsides 222 and as longitudinal sides 221. The broadside extends over a width 224 which, by way of example, is 375 mm here. A depth 223, which is, by way of example, 197 mm here, is produced along the longitudinal sides 221.

A container edge 52 surrounding the cooking container 2 extends along the side walls. The container edge 52 is formed on the broadside 222 as an outwardly projecting end edge 522. An outwardly projecting side edge 521 is arranged along the longitudinal side 221. The side edge 521 and the end edge 522 are, for example, 10 mm in width.

To ensure a minimum spacing between the cooking container 2 and muffle 13, the cooking container 2 has corners 32, which are provided with rounded regions 42. The rounded regions 42 have an external radius here of at least 35 mm. The side walls 22 have a height 220 of 40 mm. Internal radii of a maximum of 24 mm are provided on the corners 32. An internal radius of the container corners 32 configured in this manner ensures precise and stable guidance of the cooking container 2 in the support device 4. In addition, corners, which can per se cause unfavourable voltage excesses during microwave operation, are avoided.

Figure 6:
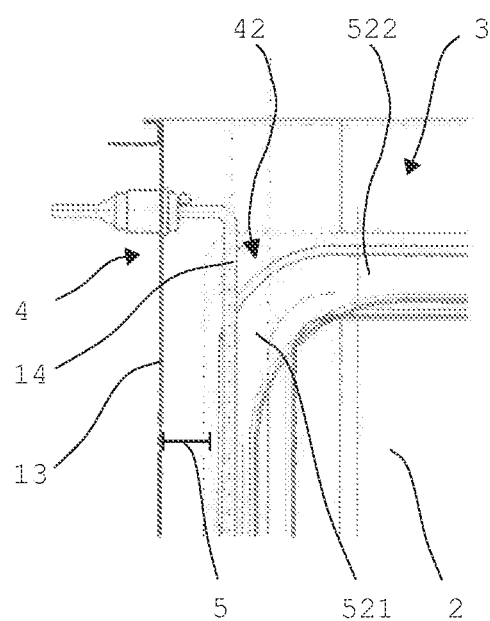
FIG. 6 is an enlarged external section of a cooking container in a cooking chamber.

FIG. 6 is a detail plan view of a cooking container 2, which is received in a cooking chamber 3 on a support device 4. The support device 4 comprises a rod 14, on which the inserted cooking container 2 rests. The rod 14 is fastened in an electrically insulated manner in a recess of a muffle 13 of the cooking chamber 3. A minimum spacing 5 of, by way of example, 15 mm is maintained here between the cooking container 2 and the muffle 13, so that no electrical flashovers occur during microwave operation.

Figure 7:
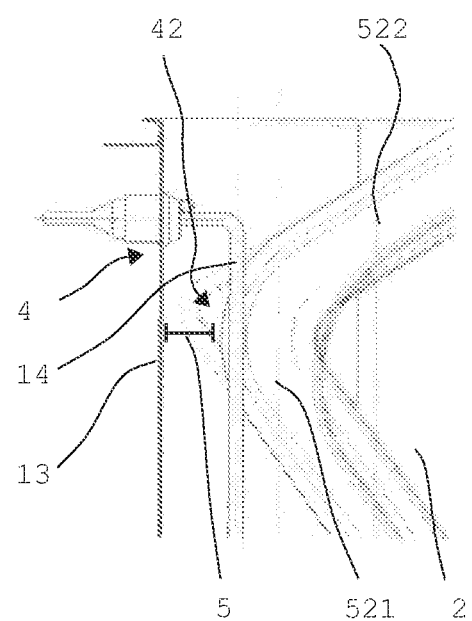
FIG. 7 is the external section according to FIG. 6 with a cooking container inserted in a tilted manner.

FIG. 7 shows the cooking container 2 of FIG. 6 in a tilted position. Because of the rounded region having an external radius of, for example, 40 mm here, the minimum spacing 5 required for protection against flashovers is also not fallen below in this tilted position. In this case, the side edge 521 of the cooking container 2 rests on the rod 14.

The cooking system 100 presented here allows the use of metallic cooking containers 2 and, in particular, stainless steel cooking containers, during microwave operation at low cost and in a hygienically safe manner, and having a large occupancy surface.

In this case, the construction of the cooking container 2 ensures that a minimum spacing 5 is always maintained between the cooking container 2 and muffle 13. This is achieved, in particular, by the rounding of the cooking container corners 32 and by the ratio of depth 223 to width 224. In the interaction between the cooking container 2 and cooking chamber 3, precise and stable guidance of the cooking container 2 is also ensured by a tight clearance being present between the cooking container 2 and support device 4, the cooking container 2 having small internal radii and the rods 14 of the support device 4 having an adequately large diameter.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 cooking appliance
2 cooking container
3 cooking chamber
4 support device
5 minimum spacing
11 microwave heat source
12 base
13 muffle
14 rod
21 combined appliance
22 side wall
32 corner
42 rounded region
52 container edge
100 cooking system
104 operating device
105 door
220 height
221 longitudinal side
222 broadside
223 depth
224 width
521 side edge
522 end edge

What is claimed is:

1. A cooking system comprising:
at least one cooking appliance comprising:
   at least one microwave heat source;
   at least one cooking container configured to receive food;
   at least one cooking chamber having at least one muffle; and
   at least one support device arranged on the at least one muffle configured to position the at least one cooking container in the at least one cooking chamber, the at least one support device including a horizontally extending rod disposed at a distance greater than a predetermined minimum spacing from the at least one muffle,
wherein the at least one cooking container has at least one base and at least four side walls arranged transversely to the base comprising at least two opposing longitudinal sides and at least two opposing broadsides,
wherein the at least one cooking container, at transitions from the at least two opposing broadsides to the at least two opposing longitudinal sides, has at least four corners, each of which has at least one rounded region having an external radius of at least 30 mm and has a projecting edge configured to rest against the horizontally extending rod so as to maintain the minimum spacing from the at least one muffle so as to counteract electrical flashovers between the at least one cooking container and the at least one cooking chamber.

2. The cooking system of claim 1, wherein the minimum spacing between the at least one cooking container and the at least one muffle is at least 8 mm.

3. The cooking system of claim 1, wherein each projecting edge comprises at least one of at least one end edge projecting outwards from at least one of the at least two opposing broadsides or at least one side edge projecting outwards from at least one of the at least two opposing longitudinal sides.

4. The cooking system of claim 3, wherein the at least one end edge is narrower than 20 mm.

5. The cooking system of claim 3, wherein a clearance between the horizontally extending rod and the at least two opposing longitudinal sides is a maximum of 4 mm.

6. The cooking system of claim 1, wherein the at least one support device has at least one stop for the at least one rounded region that is configured to limit an insertion depth of the at least one cooking container in the at least one cooking chamber.

7. The cooking system of claim 1, wherein the at least four side walls have a height of at least 30 mm.

8. The cooking system of claim 1, wherein the at least four corners each have at least one rounded region having an internal radius of a maximum of 30 mm.

9. The cooking system of claim 1, wherein the at least one cooking container has a depth along the at least two opposing longitudinal sides and a width along the at least two opposing broadsides, the width being at most three times the depth.

10. The cooking system of claim 1, wherein the at least one support device is arranged in an electrically insulated manner on the at least one muffle.

11. The cooking system of claim 1, wherein the at least one cooking appliance is configured as a combined appliance having a steam cooking function and microwave cooking function.

12. The cooking system of claim 1, wherein the at least two opposing longitudinal sides are parallel to one another and the at least two opposing broadsides are parallel to one another.

* * * * *